United States Patent [19]

Sibley

[11] Patent Number: 4,610,410

[45] Date of Patent: Sep. 9, 1986

[54] COMPOUND HELICOPTER AND POWERPLANT THEREFOR

[75] Inventor: John D. Sibley, Watford, England

[73] Assignee: Rolls-Royce Limited, London, England

[21] Appl. No.: 632,825

[22] Filed: Jul. 20, 1984

[30] Foreign Application Priority Data

Jul. 22, 1983 [GB] United Kingdom ............... 8319783

[51] Int. Cl.⁴ ..................... B64C 21/04; B64C 27/26
[52] U.S. Cl. ....................... 244/12.5; 244/6; 244/207; 244/23 D
[58] Field of Search .............. 244/207, 213, 212, 215, 244/216, 217, 23 D, 12.5, 110 B, 6, 7 R

[56] References Cited

U.S. PATENT DOCUMENTS

| | | |
|---|---|---|
| 2,940,691 | 6/1960 | David . |
| 3,332,644 | 7/1967 | Whittley . |
| 3,368,778 | 2/1968 | Wilde et al. ............... 244/6 |
| 3,375,997 | 4/1968 | Gist, Jr. . |
| 3,432,123 | 3/1969 | Conway et al. . |
| 3,442,470 | 5/1969 | Farbridge et al. ............ 244/217 |
| 3,478,988 | 11/1969 | Roed ..................... 244/216 |
| 3,503,572 | 3/1970 | Hafner ................... 244/7 R |
| 3,678,690 | 7/1972 | Shoket et al. . |
| 3,721,406 | 3/1973 | Hurlbert ................. 244/217 |
| 3,776,491 | 12/1973 | Oulton ................... 244/213 |
| 3,884,433 | 5/1975 | Alexander ................ 244/207 |
| 4,044,971 | 8/1977 | Pharris . |
| 4,175,385 | 11/1979 | Nash ..................... 244/12.5 |

FOREIGN PATENT DOCUMENTS

| | | |
|---|---|---|
| 81338 | 7/1963 | France . |
| 980608 | 1/1965 | United Kingdom . |
| 1024969 | 4/1966 | United Kingdom . |
| 1079296 | 8/1967 | United Kingdom . |
| 1108454 | 3/1968 | United Kingdom . |
| 1120658 | 7/1968 | United Kingdom . |

Primary Examiner—Galen Barefoot
Attorney, Agent, or Firm—Parkhurst & Oliff

[57] ABSTRACT

A compound helicopter shown in FIG. 1 of the drawings has wings 12 in addition to a helicopter rotor 14 and has twin powerplants 16 each including a low pressure compressor 18, a gas generator 20, a power turbine 22 driven by the gas generator and connected through a gearbox 32 to drive the helicopter rotor, and a variable area final propulsion nozzle 24 which receives the exhaust from the power turbine. Augmentor wing flaps 28 are provided on the wings and fed with air from the low pressure compressor for providing additional lift and thrust from the wings. The flaps 28 are pivotally mounted on the trailing edge of the wing and are movable to a position where the trailing edges of the flaps 28 obturate the flow through the gap between the flaps 28. In this position the flaps provide a means of decelerating the forward speed of the aircraft.

8 Claims, 3 Drawing Figures

COMPOUND HELICOPTER AND POWERPLANT THEREFOR

BACKGROUND AND SUMMARY OF THE INVENTION

This invention relates to aircraft which can take-off and land vertically (VTOL aircraft) and aircraft having a short take-off and landing capability (STOL aircraft). The invention is particularly concerned with VTOL and STOL aircraft that are also equipped with a lift augmented wing (hereinafter called an augmentor wing).

By "augmentor wing" it is meant a wing of the type in which pressurised air is blown through openings in the wing to induce an air flow over the lift developing surfaces of the wing. The air which is induced to flow over the wing augments the lift and such a wing is useful when the forward speed of the aircraft is low.

A well known example of a fixed wing aircraft having an augmentor wing is the De Havilland of Canada aircraft known as the Buffalo.

The present invention is relevant to a fixed wing aircraft or to helicopters

In our co-pending British Patent Application No. 8234318 there is disclosed a helicopter which includes a gas turbine engine having a core gas generator, a power turbine driven by the exhaust of the gas generator and connected to drive the helicopter main lifting rotor, and a variable area final propulsion nozzle for controlling the power to the rotor. This application corresponds to U.S. patent application Ser. No. 555,090, filed Nov. 25, 1983. A compressor of the engine is used to supply pressurised air to an augmentor wing. By varying the area of the propulsion nozzle, it is possible to reduce the power to the main lifting rotor and simultaneously increase the forward thrust which is developed by the engine as a turbo jet reaction. Hence it will be possible to achieve very high forward speeds than currently attainable and operate the helicopter in a mode where the main lift is developed by the wings and not by the lifting rotor.

One of the problems envisaged with such a compound helicopter is that of decelerating the forward speed of the helicopter. At very high speeds it will be impractical to tilt the rotor or pitch the nose of the helicopter upwards in the conventional way because the aerodynamic loads on the main lifting rotor would be too high. In any case, even at lower speeds, when the majority of lift is taken by the main rotor, it would be undesirable to pitch the nose of the helicopter upwards. To do so would expose the underside of the helicopter to the ground fire of an enemy position and obscure the pilot's view of the enemy positions. The pilot would also be unable to aim his armaments at the enemy ground positions until a horizontal attitude had been regained.

There is, therefore, a need to be able to decelerate the helicopter without having to rely on conventional methods and at the same time enable the helicopter to assume a level attitude.

Although the primary object is to provide a means of decelerating helicopters that are equipped with a blown augmentor wing, it is also relevant to decelerating fixed wing aircraft which have an augmentor wing.

The invention as claimed uses the flaps that are provided as part of the augmentor wing and enables these flaps to be moved into the ambient airstream and thereby decelerate the aircraft.

BRIEF DESCRIPTION OF THE DRAWINGS

An example of the invention will now be more particularly described with reference to the accompanying drawings in which.

DETAILED DESCRIPTION OF THE PREFERRED EMBODIMENTS

Figure 1:
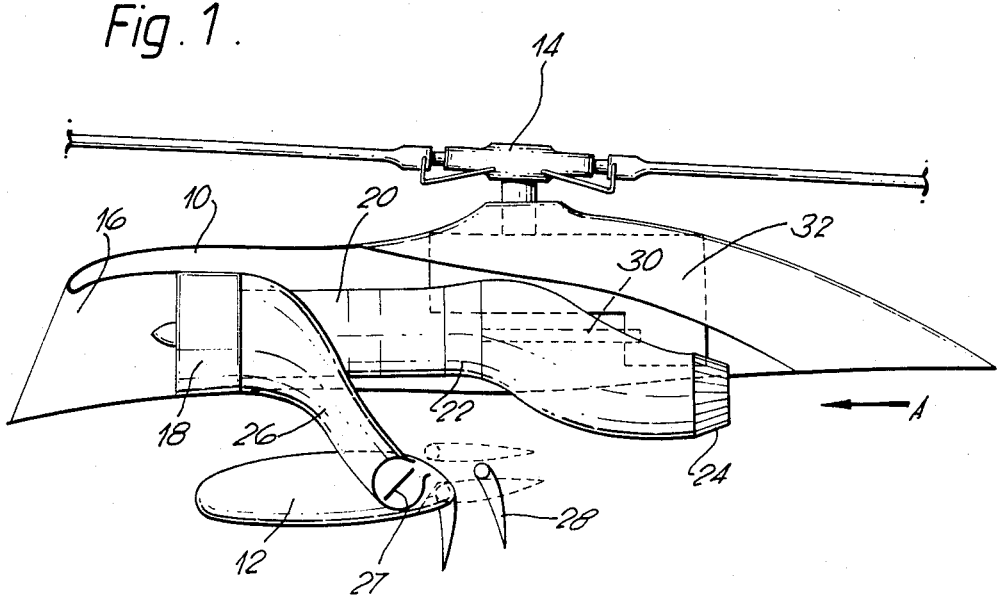
FIG. 1 shows the top part of a twin-engined compound helicopter of the invention with its helicopter rotor, augmentor wing, and gas turbine engine power plants.
Figure 2:
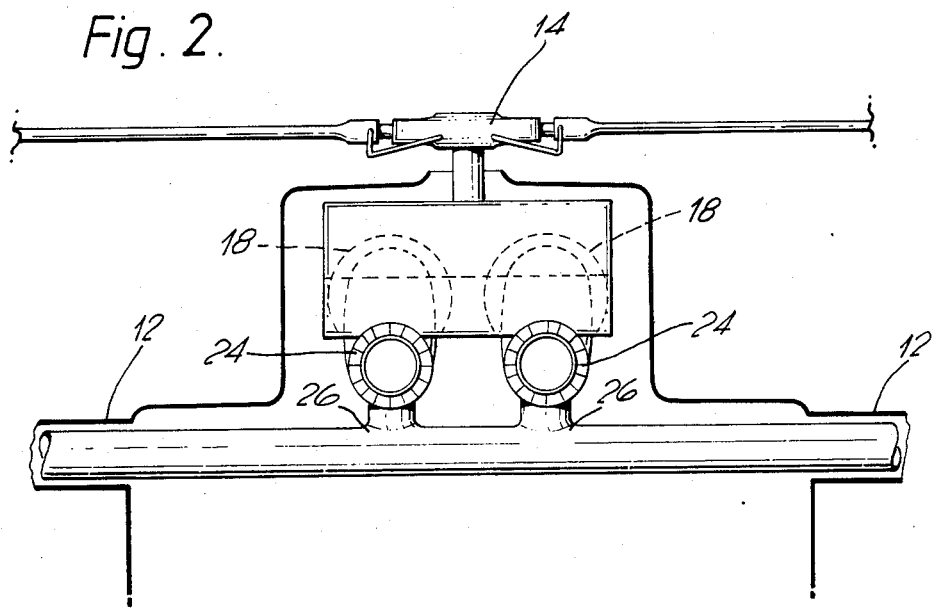
FIG. 2 is a view on arrow A of FIG. 1.

Referring now to the drawings, there is shown a compound helicopter 10 having wings 12, one on each side, and a helicopter rotor 14. Two gas turbine engine powerplants 16 are provided each having a low pressure compressor 18, a core gas generator 20 which drives the low pressure compressor, a power turbine 22 which is driven from the exhaust of the core engine, and a variable area final nozzle 24.

The arrangement of the parts of each of the powerplants are as follows: At least a part of the air flow compressed by each core engine is passed to the wings 12 via ducting 26, and the wings have augmentor flaps 28 at the trailing edges thereof. The augmentor wing is known per se and its operation is not described here in detail. It is sufficient to say that the air from the ducting 26 passes to atmosphere through the flaps 28 and induces air flowing over the aircraft wing to pass between the flaps and to stick to the top flap to increase the wing lift. The flaps 28 are also pivotable between the position shown in full lines, which provides additional downwardly directed thrust to add to the lift generated by the rotor 14, and the position shown in dotted lines which provides forward thrust. The compressed air from the two engines is supplied to opposite sides of a diaphragm 27 which divides the ducting 26 longitudinally. Thus both engines supply air to the flaps 28 along the whole length of the wing and, failure of one engine will not affect the flow from the other one. The core gas generator 20 produces power to drive the compressor 18, and the exhaust from the gas generator passes through the power turbine 22. A shaft 30 and gearbox 32 interconnect both of the power turbines 22 with the helicopter rotor 14 to drive the rotor. The exhaust from each of the power turbines passes to atmosphere through the variable area final nozzle, which, in this example, is shown pointing rearwards all of the time, but which could, if desired, be vectorable to direct the exhaust gases downwardly, for increasing lift, or sideways for attitude control.

The operation of the compound helicopter is as follows:

For take-off each of the gas turbine powerplants is run at maximum power with the variable area final nozzle in its maximum area position. This provides the greatest pressure drop across the power turbine and hence maximum drive to the rotor 14 which generates most of the lift, and minimum propulsive thrust from the final nozzle. Additional lift is generated by the compressed air from the low pressure compressor passing through the augmentor flaps 28 which are pivoted to direct the air downwardly. Thus, the helicopter can take off vertically with only a very minor part of the energy remaining in the exhaust gases creating virtually no forward thrust from the variable area final nozzles 24. Clearly, if the variable area final nozzles 24 are made to be vectorable to direct the exhaust gases downwardly, any energy remaining could be directed to provide still further lift.

Once airborne, if a conventional tilting helicopter rotor is used, forward flight can be initiated in the normal way. Alternatively the area of the final nozzles can be adjusted to produce some forward thrust which will provide some forward velocity so that gradually the wings will start to produce lift. This process can be hastened by gradually pivoting the augmentor flaps 28 towards the horizontal position which provides a gradually increasing forward thrust. When the wings have started to contribute to the lifting force necessary to keep the helicopter in the air, the variable area final nozzles 24 are closed down to off-load the power turbine 22 thus reducing the power to the helicopter rotor 14 and increasing still further the forward thrust on the helicopter.

The reduction of power to, and consequent slowing down of, the helicopter rotor is such as to enable relatively high forward speeds of the order of 250 mph to be achieved without the rotor the tip mach number of the advancing rotating blades becoming excessive.

The advantages of the augmentor wing as part of the combination are that it has a high lift coefficient in arising flight which allows the wing plan area to be minimized. This reduces the effect of the rotor downwash on the wing and minimizes vertical drag on the wing at low forward speeds.

A further advantage of a compound helicopter as described above is that by simply choosing an appropriate nozzle area, enough forward thrust can be produced without a significant loss of lift from the rotor, to enable the helicopter to perform a short take-off if overloaded, by running forward on the ground until the wing lift is sufficient to provide lift-off. This can significantly increase the range of the helicopter by increasing the amount of fuel carried at take-off.

Figure 3:
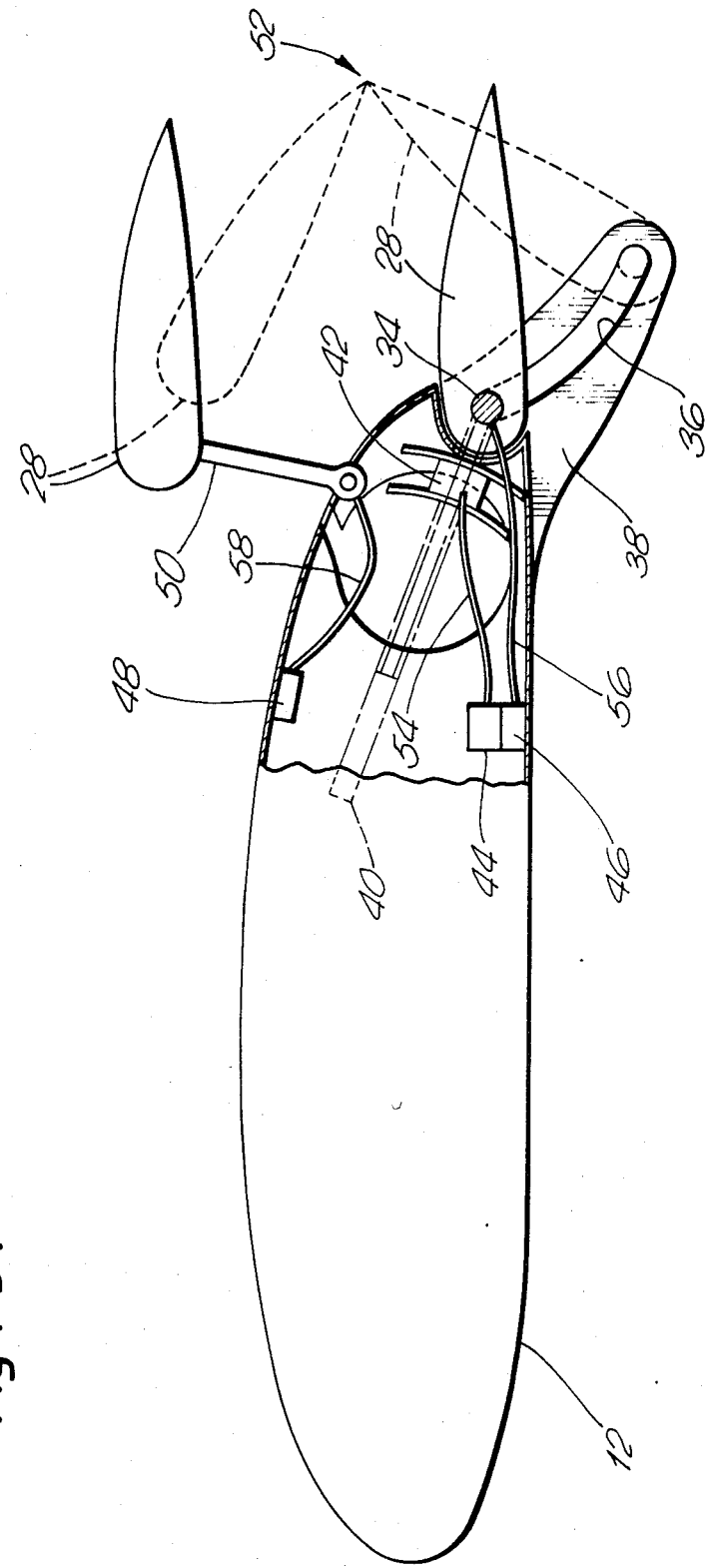
FIG. 3 depicts a further embodiment of the invention.

Referring now to FIG. 3 in which like parts have like numerals. The lower flap 28 has a pivotal mounting 34 by which it is connected to the wing 12. The lower flap 28, however, is so arranged that it can also move bodily in arcuate grooves 36 formed in a pair of end plates 38, only one of which is shown.

The movement bodily of the lower flap 28 is achieved by means of a screw 40 which engages a captive nut 42 and has one end connected to the lower flap 28. On rotation of the captive nut 42 by power means 44, the screw 40 moves axially by itself through the nut 42 and in so doing, pushes the lower flap 28 in a generally downstream direction. The arcuate grooves 36, however, force the leading edge of the lower flap 28 to follow a fixed path. At the same time, a further power means 46 rotates the lower flap 28 about its pivot axis so as to cause the lower flap 28 to adopt the attitude shown in dotted lines.

A further power means 48 is connected to pivot a link 50 about its inner end, so as to move the upper flap 28 into the position shown in dotted lines. When both upper and lower flaps 28 are moved as described, an aerodynamic brake 52 is provided.

The power means 44 to 48 inclusive, may be any suitable motors, e.g. electric or hydraulic and their drive connections to their respective parts, i.e. nut 42 pivot 34 and the pivot of link 52 may comprise flexible cables 54,56 and 58 of known kind, driving gearing of known type. Moreover, the actuation of the motors 44 to 48 may be synchronised so as to effect appropriate movements of the flaps 28.

It is to be understood that the low pressure compressor 18 may be a single or multi-stage fan and that the fan may be a variable pitch fan to give greater flexibility to the power plant and give it a faster response rate.

From the description of FIG. 3 it will be seen that the lower flap 28 effectively forms an elevator (or aileron or elevron) of the wing when it is in the position shown by the solid lines. When the flaps 28 are moved to the position shown dotted in FIG. 3, the trailing edges of the flaps come together to obturate the airflow in the gap between the flaps. At the same time the upstream region of the lowermost flap 28 is caused to move into the ambient air which flows under the wing. The flaps act as an aerodynamic brake, and to a certain extent may act like a thrust reverser. It is conceivable that such a mode of operation may diminish the lift produced by the wing. With a helicopter described herein this presents no problem because, as the helicopter is decelerated, more power is supplied to the rotor and the helicopter is supported by the lifting rotor.

The invention may, however, be applicable to fixed wing aircraft. With some designs of aircraft the diminished lift produced by the wing may not cause too great a problem. With other aircraft designs it may be necessary to provide other lift generating devices such as separate lift engines, engines with vectorable nozzles, or additional wing surfaces.

I claim:

1. An aircraft provided with a wing which incorporates a lift augmentation device comprising a pair of spaced flaps at a trailing edge of the wing, a duct which terminates in one or more fluid discharge openings in a surface of the wing, and means for supplying compressed air to the duct, said one or more openings being positioned relative to the flaps so that air issuing from the one or more openings induces an air flow in the space between the flaps and thereby generates lift by causing air to flow over lift producing surfaces of the wing and flaps, said flaps being an upper flap and a lower flap, said lower flap constituting an elevator of the wing, said upper and lower flaps being movable to a position where they cooperate with each other to obturate the flow of air in the space between the flaps and provide a means for decelerating the forward speed of the aircraft, the lower flap being mounted on a pivot movable relative to the wing along a path which causes an upstream edge of the lower flap to move in a direction away from the wing, actuation means being provided for pivoting the lower flap and moving the pivot along the path thereby causing the upstream edge of the lower flap to move into the ambient air flowing under the wing.

2. An aircraft according to claim 1 in which the aircraft is a fixed wing aircraft and the aircraft is provided with means, independent of said wing, for generating lift.

3. An aircraft according to claim 1 wherein the aircraft is a helicopter which has a gas turbine engine which comprises a compressor which constitutes the means for supplying compressed air to the duct, a power turbine driven by a hot gas efflux of the engine and connected to drive a main lifting rotor of the helicopter, and a variable area propulsion nozzle which receives the hot gas efflux from the power turbine and controls the power supplied to the lifting rotor.

4. An aircraft according to claim 1 wherein the upper and lower flaps are pivotally mounted on the wing at an upstream region of each flap, and an actuation means is provided for pivoting the flaps to cause the trailing edges of the flaps to come together to obturate the air flow.

5. An aircraft according to claim 1 wherein the actuation means includes a first actuation means for rotating the lowermost flap about the pivot and a second actuation means for moving the pivot, and hence an upstream region of the lowermost flap, along said path.

6. An aircraft according to claim 5 wherein the first actuation means comprises a motor which operates via a flexible shaft and gear means to rotate the flap about its pivot.

7. An aircraft according to claim 5 wherein the second actuation means comprises a lead screw which carries the pivot and the lead screw is supported for rotation in a nut which is rotatably driven by a motor.

8. An aircraft according to claim 1 wherein the path along which the pivot is moved is defined by a groove.

* * * * *